(12) United States Patent
Kruepke et al.

(10) Patent No.: US 11,298,730 B2
(45) Date of Patent: Apr. 12, 2022

(54) DRAIN CLEANER CORD RETENTION SYSTEM

(71) Applicant: Ridge Tool Company, Elyria, OH (US)

(72) Inventors: Scott Kruepke, North Royalton, OH (US); Robert Skrjanc, Lorain, OH (US); Glen R. Chartier, Avon Lake, OH (US); Ben Azzam, Avon Lake, OH (US); Billy Yrad, Elyria, OH (US)

(73) Assignee: Ridge Tool Company, Elyria, OH (US)

( * ) Notice: Subject to any disclaimer, the term of this patent is extended or adjusted under 35 U.S.C. 154(b) by 664 days.

(21) Appl. No.: 16/212,940

(22) Filed: Dec. 7, 2018

(65) Prior Publication Data

US 2019/0184434 A1 Jun. 20, 2019

Related U.S. Application Data

(60) Provisional application No. 62/598,536, filed on Dec. 14, 2017.

(51) Int. Cl.
| | | |
|---|---|---|
| *B08B 9/027* | (2006.01) | |
| *B08B 9/045* | (2006.01) | |
| *H01R 13/639* | (2006.01) | |
| *B65H 75/44* | (2006.01) | |
| *E03C 1/30* | (2006.01) | |
| *H02G 7/05* | (2006.01) | |
| *H02G 15/007* | (2006.01) | |

(52) U.S. Cl.
CPC ......... *B08B 9/045* (2013.01); *B65H 75/4476* (2013.01); *H01R 13/6392* (2013.01); *B08B 2209/027* (2013.01); *E03C 1/30* (2013.01); *H02G 7/05* (2013.01); *H02G 15/007* (2013.01)

(58) Field of Classification Search
CPC ..... H01R 13/6392; B08B 9/027; B08B 9/045; B08B 2209/027; E03C 1/30; H02G 7/05; H02G 15/007
See application file for complete search history.

(56) References Cited

U.S. PATENT DOCUMENTS

| | | | | |
|---|---|---|---|---|
| 3,275,780 A * | 9/1966 | Baba | ................. | B65H 75/4434 242/385.1 |
| 4,154,324 A * | 5/1979 | Upton | ................... | H02G 11/02 200/61.15 |
| 4,300,665 A * | 11/1981 | Arechaga | ............... | B65H 75/44 191/12.4 |
| 6,076,219 A * | 6/2000 | Irwin | ..................... | E03F 9/005 15/104.33 |
| 7,676,879 B1 * | 3/2010 | Rutenberg | ............. | B08B 9/045 15/104.31 |

(Continued)

OTHER PUBLICATIONS

Operator's Manual for K-60SP (52 pages 2004): Earliest identified publication Jun. 2003.

(Continued)

*Primary Examiner* — J C Jacyna
(74) *Attorney, Agent, or Firm* — Mark E. Bandy; Rankin Hill & Clark, LLP

(57) ABSTRACT

Electrical power supply cord retention systems are described. Also described are drain cleaning machines using such cord retention systems. In addition, methods of selectively retaining power cords in association with drain cleaning machines are described.

23 Claims, 3 Drawing Sheets

(56) References Cited

U.S. PATENT DOCUMENTS

| | | | |
|---|---|---|---|
| 8,931,131 B1* | 1/2015 | Feduke | B65H 75/364 |
| | | | 134/6 |
| 9,368,303 B2* | 6/2016 | Tracey | H01H 37/72 |
| 2009/0211044 A1* | 8/2009 | Hale | B08B 9/045 |
| | | | 15/104.33 |
| 2011/0139696 A1* | 6/2011 | Fukuyo | C02F 1/78 |
| | | | 210/173 |
| 2011/0209692 A1* | 9/2011 | Gobright, IV | B28D 1/045 |
| | | | 125/13.01 |
| 2013/0239357 A1* | 9/2013 | Hoffman | E01H 1/08 |
| | | | 242/400.1 |

OTHER PUBLICATIONS

Parts List for K-60SP (2 pages, 2008).
Operator's Manual for K-75A/B, K-1500A/B, K-1500SP (52 pages, 2005): Earliest identified publication Jun. 1992.
Parts List for K-75A, K-75B, K-1500A, K-1500B, K-1500ASP, K-1500BSP (5 pages): Earliest identified publication Jun. 7, 2010.

* cited by examiner

DRAIN CLEANER CORD RETENTION SYSTEM

CROSS REFERENCES TO RELATED APPLICATIONS

This application claims priority from U.S. provisional application Ser. No. 62/598,536 filed on Dec. 14, 2017.

FIELD

The present subject matter relates to drain cleaning equipment and particularly drain cleaning machines that are electrically powered and which include electrical power supply cords.

BACKGROUND

Drain cleaning equipment users express displeasure with the time required to unwrap the electrical power supply cord from their equipment due to the large number of wraps required to completely release the cord from the unit. Some users would rather bring an extension cord to the machine and allow the unit-supplied electrical cord to remain in the cord holder on the equipment rather than unwrap the unit-supplied cord and plug that cord directly into a nearby outlet.

Further, drain cleaner users indicate that cord management on machines can be an issue due to the very limited space typically available on their vans/trucks. Loose or improperly wrapped cords can result in damaged cords or damaged cord holders if such cords or holders are exposed to their surroundings during transit or handling.

Accordingly, in view of these and other concerns, a need exists for an improved technique and assembly for selectively and releasably retaining an electrical power supply cord with drain cleaning equipment.

SUMMARY

The difficulties and drawbacks associated with previous approaches are addressed in the present subject matter as follows.

In one aspect, the present subject matter provides an electrically powered machine comprising an enclosure and frame defining an exterior surface and an interior region. The machine also comprises an electric motor supported on the frame or otherwise disposed in the interior region. The machine additionally comprises an electrical power supply cord for providing electric power to the electric motor. The cord defines a distal end at which is located an electrical plug. The machine also comprises a selectively moveable member for actuating the machine. The member is positionable between a first position and a second position at which machine use is enabled. The member includes a cord hold on the member. The cord hold is adapted to retain the cord when the member is at the first position and release the cord when the member is at the second position.

In another aspect, the present subject matter provides a drain cleaning machine comprising a frame assembly and an electric motor supported on the frame. The machine also comprises an electrical power supply cord for providing electric power to the electric motor. The cord defines a distal end at which is located an electrical plug. The machine additionally comprises a lever pivotally secured to the drain cleaning machine. The lever is positionable between a first position and a second position at which machine use is enabled. The lever includes a cord hold configured to retain the cord when the lever is at the first position and release the cord when the member is at the second position.

In yet another aspect, the present subject matter provides a method for retaining and releasing an electrical power supply cord used in a drain cleaning machine. The machine includes (i) an enclosure and frame defining an exterior surface and an interior region; (ii) an electric motor supported on the frame or otherwise disposed in the interior region, (iii) an electrical power supply cord for providing electric power to the electric motor, the cord defining a distal end at which is located an electrical plug, and (iv) a selectively moveable member for actuating the drain cleaning machine. The member is positionable between a first position and a second position at which machine use is enabled. The member includes a cord hold adapted to retain the cord when the member is in the first position and release the cord when the member is in the second position. The method comprises positioning the member in the first position. The method also comprises wrapping the cord between the cord hold and at least one other location on the drain cleaning machine to form a wound cord. The method further comprises positioning the member from the first position to the second position, thereby imparting slack into the wound cord and enabling release of the cord from the cord hold.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

The present subject matter applies to drain cleaning equipment, and particularly sectional drain cleaning equipment, having a power cord for transmitting electrical power to the unit. The present subject matter could further apply to other drain cleaning equipment or any application in which an electrical cord is present and a moveable actuation handle is used to engage the machine function.

The present subject matter features a cord hold incorporated in a machine actuation mechanism, which allows the cord to be freed when the actuation mechanism is selectively positioned or otherwise displaced. That is, the cord is released when the actuation mechanism is placed in its typical position for machine use. Removing the cord from the unit requires little effort beyond the normal job setup that is typical of such drain cleaning machines, which includes actuating a primary handle to open the clutch jaws for cable insertion.

Further, in many embodiments, the present subject matter features a dedicated cord wrap region on the machine that is integral in the machine configuration, thereby minimizing or reducing the number of wraps required to retain the entirety of the electrical supply cord. This integral cord wrap additionally protects the cord from potential damage during machine transport or handling due to its integration into the main machine.

The present subject matter cord holds and features can be incorporated in a wide array of drain cleaning machines. Nonlimiting examples of such machines include those available under the RIDGID designation for example, K-60, K-50, K-1500, and K-5208 sectional machines. It is also contemplated that the present subject matter could also be implemented in drum drain cleaning machines such as for example, K-7500, K-6200, K-3800, K-400, and K-750 machines available under the RIDGID designation. The present subject matter can also potentially be incorporated in other drain cleaning equipment from other suppliers or manufacturers.

Figure 1:
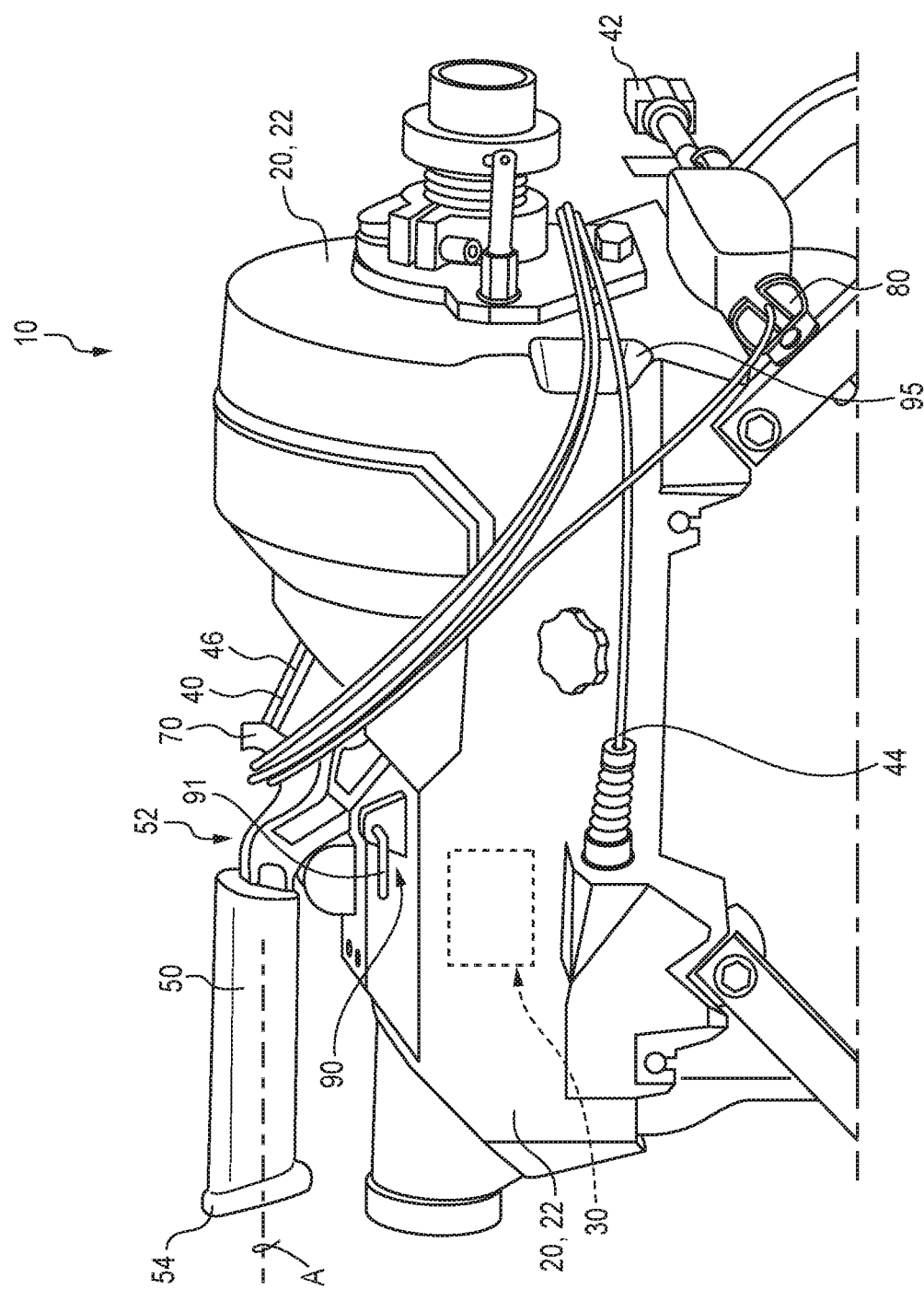
FIG. 1 is a partial perspective view of a drain cleaning machine utilizing an embodiment of a cord retention system in accordance with the present subject matter, showing retainment of a cord.
Figure 2:
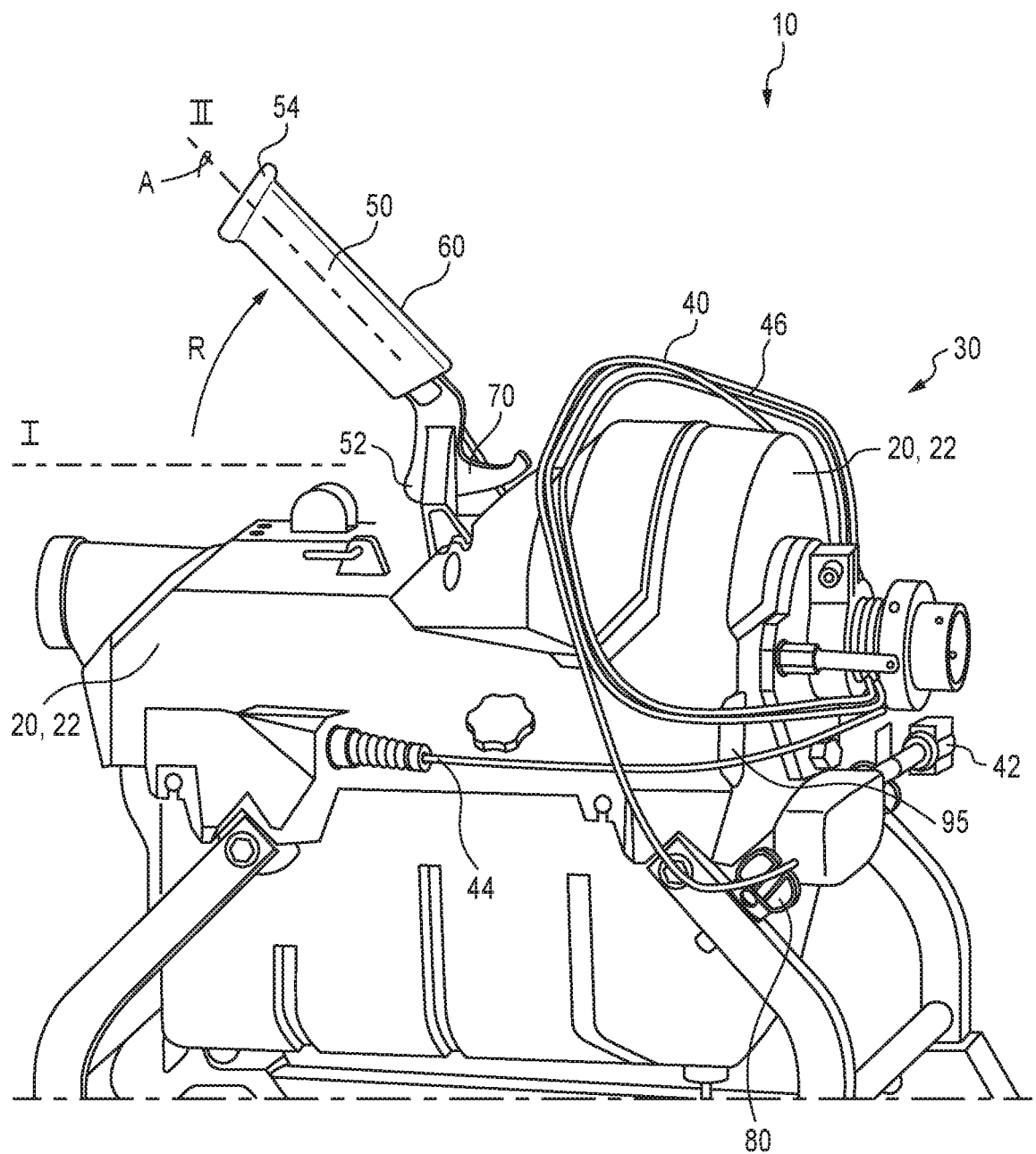
FIG. 2 is a partial perspective view of the machine and system of FIG. 1, showing release of the cord.

FIGS. 1 and 2 illustrate a drain cleaning machine having an electrical power supply cord and an embodiment of a cord retention system in accordance with the present subject matter. The drain cleaning machine 10 comprises an enclosure and/or frame 20 defining an exterior surface 22 and an interior region. The drain cleaning machine 10 also comprises an electric motor 30 generally supported on the frame 20 and/or typically disposed within the interior region. However, the present subject matter includes machines in which the motor 30 is exposed and not enclosed or disposed in the interior region of the enclosure or frame. The drain cleaning machine 10 also comprises an electrical power supply cord 40. The cord 40 includes a plug 42 located at a distal end of the cord 40, and a base end 44 at which the cord 40 is secured or otherwise affixed to the machine 10. The cord 40 includes a flexible intermediate portion 46 extending between the plug 42 and the base end 44. The drain cleaning machine 10 also comprises a selectively moveable or positionable member or lever such as a handle 50. The handle 50 defines a proximal end 52 and an opposite distal end 54. The handle 50 includes a cord hold 70. The drain cleaning machine 10 may also comprise a selectively positionable latch assembly 90 for governing movement or positioning of the handle 50. In many versions, the drain cleaning machine 10 also comprises one or more stationary cord holds 80. These and other aspects are described in greater detail herein.

Figure 3:
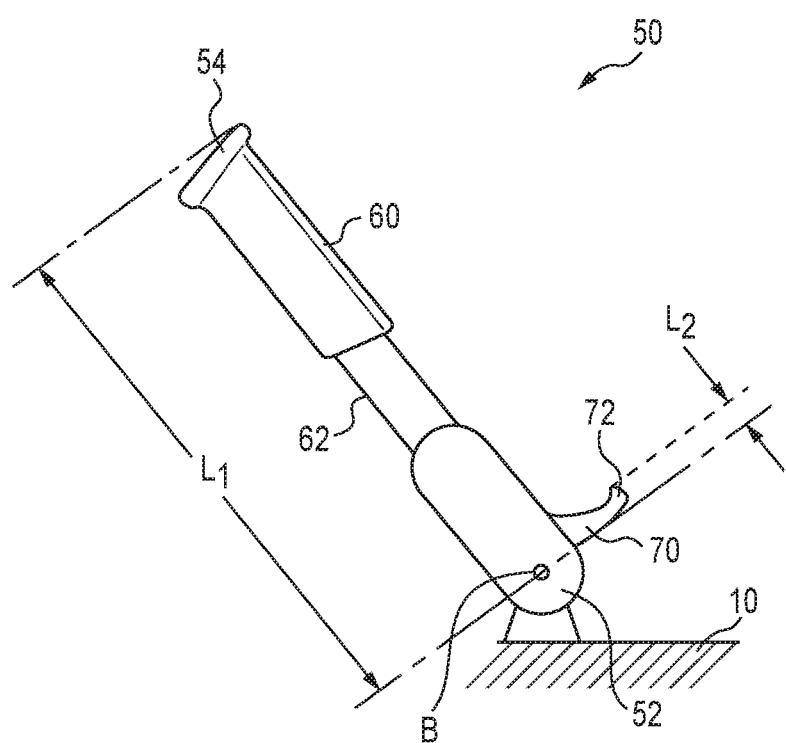
FIG. 3 is a schematic side view of an embodiment of an actuating member having a cord hold used in a drain cleaning machine and system according to the present subject matter.

FIG. 3 is a schematic side view of an embodiment of an actuating moveable member such as the handle 50 having a cord hold 70 used in drain cleaning machine 10 according to the present subject matter. In the particular embodiment depicted in FIG. 3, the actuating member 50 is pivotally secured along a rotation axis B to a support structure or machine such as the drain cleaning machine 10. The actuating member 50 includes a cord hold 70 that is adapted, i.e., sized and shaped, to (i) retain the electrical power supply cord 40 when the actuating member 50 is in a position corresponding to non-use or an inoperable state of the machine 10, and (ii) release the cord 40 when the actuating member 50 is in a position corresponding to use or operation of the machine 10. Typically, when the actuating member 50 is in the position corresponding to non-use or an inoperable state of the machine 10, this position does not by itself prevent the machine from being energized. While a user cannot perform meaningful machine function, for example the machine typically cannot rotate the drain cable, without rotating or moving the handle; this position does not necessarily make actuation impossible. In fact, this position, without being locked in place, could be the extent of travel of the actuation handle and the machine could be used to rotate the cable by moving the handle to this position if the user positions the actuation member in a second position, places a cable through the machine, then moves the actuation member back to the first position. Specifically, as shown in FIG. 2, the actuating member 50 is positionable between a first position I and a second position II. Typically, the member 50 is positioned from position I to position II by pivotally displacing or moving the actuating member 50 in the direction of arrow R. Positions I and II are taken with respect to a longitudinal axis A of the actuation member 50. Typically, in selecting position II, the actuation member 50 is moved from position I through an angle greater than 0° up to about 180° or more, typically greater than 0° up to about 135°, more typically, greater than 0° up to about 90°, and in certain versions greater than 0° up to about 60°. It will be understood that the present subject matter is not limited to any of these angular ranges and includes other ranges and/or types of movement of the member 50.

As noted, a latch assembly 90 can be provided in association with the actuating member 50. In certain versions, a latch pin 91 of the latch assembly 90 is positionable between (i) an engaged position in which the pin 91 is engaged with and secured to the member 50 when the member 50 is in position I, thereby precluding movement of the member 50 from position I such as to or toward position II, and (ii) a disengaged position in which the member 50 may be moved from position I such as to or toward position II. It is through removal of engagement of the latch pin 91 from the actuation member 50 that the actuation member 50 is allowed to rotate to the second position, i.e., position II, thereby providing slack to the electrical cord for easy removal. In the present embodiment, the latch pin 91 is spring biased out, to urge disengagement from the actuation member 50. To engage, the user pushes the latch pin 91 in place, then rotates the pin 91 to hold the pin 91 in position. This results in holding or securing the actuation member 50 in position I. To remove or disengage the pin 91, the user rotates the pin 91 and the spring bias force disengages the latch pin 91 from the actuation member 50.

Referring further to FIG. 3, the cord hold 70 may exhibit a wide array of different shapes. In many embodiments, the cord hold includes a distally located hook portion 72. The cord hold 70 can be affixed, secured, or otherwise attached to the actuation member 50. Alternatively, the cord hold can be integral or integrally formed with the actuation member 50. The cord holder 70 can be located at nearly any position on the actuation member 50. In many versions, the cord hold is located on a lead face 62 of the member. The term "lead face" refers to a surface or region of the member 50 which is directed toward position II as a user moves the member 50 from position I to position II. FIG. 3 also shows oppositely directed trailing face 62 of the member 50.

The cord hold 70 is typically located adjacent to the proximal end 52 of the actuation member 50. For such versions, the cord hold 70 is located within a length region of about 20%, and more particularly within about 10%, from the axis B of pivotal securement of the member 50 to the machine 10. More specifically, the hook portion 72 of the cord hold 70 is located at a distance $L_2$ as measured from the axis B in which $L_2$ is a value of from about 1% to about 20% of the total length $L_1$ of the member 50.

The drain cleaning machine cord retention system may additionally comprise one or more additional cord holds. Such additional cord holds are typically located along an exterior surface 22 of the enclosure or frame 20. These additional cord holds are stationary and represented by cord hold clip 80 for example.

In particular versions of the machines and for example the drain cleaning machines, the enclosure or housing includes one or more recessed regions, dimples, or indentations 95 as depicted in FIGS. 1 and 2. Typically, these indentations 95 may be defined along corner edges or other regions of the enclosure. The indentations 95 promote locating the cord into the cord hold clip 80 when the wrap is completed. Without the dimples/indentations, the wrap would not be consistent and would likely result in the distal end or plug 42 of the cord falling outside of the intended area by the cord hold clip 80.

Referring further to FIGS. 1-3, as previously described the cord hold 70 is provided on the lead face 60 of the handle 50, and near the proximal end 52 of the handle 50, and within a length region $L_2$ that is less than 20% of the total length of the handle 50, shown as $L_1$. In particular versions, the cord hold 70 is located on the lead face 60 of the handle 50 within a length region $L_2$ that is less than 10% of the total length of the total length of the handle 50, shown as $L_1$.

In certain versions, the height of the hook 72 perpendicular to the axis A of the handle 52 is important, as well as the angle of rotation, to develop a certain arc-length of travel of the cord when placed within the hook 72. If the arc-length of travel of the hook 72 area is too small, the cord will not develop adequate slack when the handle is moved from position I to position II and, therefore, will not be freed from engagement with the hook.

The present subject matter also provides methods for retaining and releasing an electrical power supply cord used in a drain cleaning machine or other equipment. The drain cleaning machine is as previously described herein for example. The method comprises positioning the actuation member in the first position. The method also comprises wrapping the cord between the cord hold on the member and at least one other location or cord hold on the machine to thereby form a wound cord. The method also comprises positioning the actuation member from the first position to the second position at which machine use is enabled. This imparts slack into the wound cord and enables release of the cord from the cord hold.

An advantage of the cord retention system is time savings and efficiency. The user is no longer required to manually unwrap the cord from around an on-board cord holder, but can free the included electrical power supply cord by simply releasing the actuation handle as part of the normal tool or machine operation. By simplifying the cord wrap placement and providing a quick release to the cord hold that is functional to the machine, the user can utilize the unit-provided electrical cord and save time in its use.

Customer feedback has suggested that extension cords are often used on jobsites, partially due to the displeasure with existing cord holders. Therefore, extension cord use can be reduced or in certain situations avoided due to the simpler machine cord quick release, eliminating the need to transport and store these extension cords, resulting in greater space available for equipment and tools needed for the job at hand.

The cord retention system on the machine body provides a very visual and quick wrap, reducing clean-up time when finishing a job and making the machine easier to use for new users.

In addition, damage to the cord will be reduced due to a better protected cord wrap that is functionally built into the machine body. By integrating the cord wrap into the body of the unit or machine, the cord is better protected for storage during machine handling or transport.

Although the present subject matter is described herein in association with drain cleaning machines, it will be understood that the subject matter can also be incorporated in other equipment or machines, such as but not limited to rodder machines such as K-1000 available under the RIDGID designation; and water jetting machines such as KJ-1350, KJ-1750, KJ-3100, and KJ-2200 available under the RIDGID designation.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. An electrically powered machine comprising:
an enclosure and a frame;
an electric motor supported on the frame;
an electrical power supply cord for providing electric power to the electric motor, wherein the cord defines a distal end at which is located an electrical plug;
a selectively moveable member for actuating the machine, wherein the selectively movable member is positionable between a first position and a second position, wherein machine use is enabled at the second position, and wherein the selectively movable member includes a cord hold adapted to retain the electrical power supply cord when the selectively movable member is at the first position and release the cord when the member is at the second position.

2. The machine of claim 1 wherein the machine is a drain cleaning machine.

3. The machine of claim 1 wherein the selectively movable member is in the form of a lever pivotally secured to the machine.

4. The machine of claim 1 wherein the cord hold includes a distally located hook portion.

5. The machine of claim 1 wherein the cord hold is integral with the member.

6. The machine of claim 1 wherein the cord hold is located on a lead face of the member.

7. The machine of claim 1 wherein the member defines a proximal end at which the member is pivotally secured to the machine, and an opposite distal end, wherein the cord hold is located adjacent to the proximal end.

8. The machine of claim 7 wherein the cord hold is located within a length region of about 20% of the distance between an axis of pivotal securement defined by the member to the machine.

9. The machine of claim 7 wherein the cord hold is located within a length region of about 10% of the distance between an axis of pivotal securement defined by the member to the machine.

10. The machine of claim 2 further comprising: a second cord hold.

11. The machine of claim 10 wherein the second cord hold is located along an exterior surface of the enclosure.

12. The machine of claim 1 further comprising: a latch assembly including a latch pin positionable between (i) an engaged position in which the selectively movable member is secured at the first position, and (ii) a disengaged position in which the member is movable away from the first position.

13. The machine of claim 12 wherein upon the latch pin being at the disengaged position, the selectively movable member can be moved to the second position.

14. A drain cleaning machine comprising: a frame assembly; an electric motor supported on the frame; an electrical power supply cord for providing electric power to the electric motor, the cord defining a distal end at which is located an electrical plug; a lever pivotally secured to the drain cleaning machine, the lever positionable between a first position and a second position at which machine use is enabled, the lever including a cord hold configured to retain the cord when the lever is at the first position and release the cord when the member is at the second position.

15. The drain cleaning machine of claim 14 wherein the cord hold includes a distally located hook portion.

16. The drain cleaning machine of claim 14 wherein the cord hold is located on a lead face of the lever.

17. The drain cleaning machine of 14 wherein the cord hold is located within a length region 20% from the axis of pivotal securement of the lever to the machine.

18. The drain cleaning machine of claim 14 wherein the cord hold is located within a length region 10% from the axis of pivotal securement of the lever to the machine.

19. The drain cleaning machine of claim 14 further comprising: a second cord hold.

20. The drain cleaning machine of claim 19 wherein the second cord hold is located along an exterior surface of the drain cleaning machine.

21. The drain cleaning machine of claim 14 further comprising: a latch assembly including a latch pin positionable between (i) an engaged position in which the lever is secured at the first position and (ii) a disengaged position in which the lever is positionable from the first position.

22. The drain cleaning machine of claim 21 wherein upon the latch pin being at the disengaged position, the lever can be positioned to the second position.

23. A method for retaining and releasing an electrical power supply cord used in a drain cleaning machine, the machine including (i) an enclosure and frame defining an exterior surface and an interior region; (ii) an electric motor supported on the frame, (iii) an electrical power supply cord for providing electric power to the electric motor, the cord defining a distal end at which is located an electrical plug, and (iv) a selectively moveable member for actuating the drain cleaning machine, the member positionable between a first position and a second position in which machine use is enabled, the member including a cord hold adapted to retain the cord when the member is in the first position and release the cord when the member is in the second position, the method comprising: positioning the member in the first position; wrapping the cord between the cord hold and at least one other location on the drain cleaning machine to form a wound cord; positioning the member from the first position to the second position, thereby imparting slack into the wound cord and enabling release of the cord from the cord hold.

* * * * *